(12) United States Patent
Juels et al.

(10) Patent No.: US 8,984,384 B1
(45) Date of Patent: Mar. 17, 2015

(54) DISTRIBUTED STORAGE SYSTEM WITH EFFICIENT HANDLING OF FILE UPDATES

(75) Inventors: Ari Juels, Brookline, MA (US); Kevin D. Bowers, Melrose, MA (US); Alina Oprea, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 394 days.

(21) Appl. No.: 12/827,097

(22) Filed: Jun. 30, 2010

(51) Int. Cl.
*G06F 21/62* (2013.01)
*H04L 29/08* (2006.01)

(52) U.S. Cl.
CPC .......... *G06F 21/6218* (2013.01); *H04L 67/1097* (2013.01)
USPC .......................................................... 714/800

(58) Field of Classification Search
CPC ........................ G06F 21/6218; H04L 67/1097
See application file for complete search history.

(56) References Cited

U.S. PATENT DOCUMENTS

| | | | | |
|---|---|---|---|---|
| 5,519,849 | A * | 5/1996 | Malan et al. | 711/114 |
| 7,313,721 | B2 * | 12/2007 | Ashmore | 714/6.32 |
| 7,823,009 | B1 * | 10/2010 | Tormasov et al. | 714/6.12 |
| 8,108,912 | B2 * | 1/2012 | Ferris | 726/3 |
| 2006/0143505 | A1 * | 6/2006 | Olarig et al. | 714/6 |

OTHER PUBLICATIONS

G. Ateniese et al., "Provable Data Possession at Untrusted Stores," ACM CCS, 2007, pp. 598-610.

G. Ateniese et al., "Scalable and Efficient Provable Data Possession," Proceedings of the 4th International Conference on Security and Privacy in Communication Networks, Apr. 2008, 11 pages.

M. Bellare et al., "Forward-Security in Private-Key Cryptography," Topics in Cryptology—CT-RSA, Nov. 2000, 24 pages.

J. Black et al., "UMAC: Fast and Secure Message Authentication," CRYPTO '99, Advances in Cryptology, Aug. 1999, 18 pages.

M. Blum et al., "Checking the Correctness of Memories," Algorithmica, Oct. 1992, 21 pages, vol. 12, Nos. 2-3.

K.D. Bowers et al., "Proofs of Retrievability: Theory and Implementation," IARC ePrint Report, 2008, pp. 1-24.

C. Cachin et al., "Asynchronous Verifiable Secret Sharing and Proactive Cryptosystems," Proceedings of the 9th ACM Conference on Computer and Communications Security, Aug. 2002, 25 pages, Washington DC, USA.

C. Cachin et al., "Asynchronous Verifiable Information Dispersal," 24th IEEE Symposium on Reliable Distributed Systems, Nov. 2004, 20 pages.

(Continued)

*Primary Examiner* — Steve Nguyen
(74) *Attorney, Agent, or Firm* — Ryan, Mason & Lewis, LLP

(57) ABSTRACT

A client device or other processing device comprises a file encoding module, with the file encoding module being configured to separate a file into a plurality of sets of file blocks, to assign sets of the file blocks to respective ones of a plurality of servers, to define a plurality of parity groups each comprising a different subset of the plurality of servers, to assign, for each of the servers, each of its file blocks to at least one of the defined parity groups, and to compute one or more parity blocks for each of the parity groups. The file blocks are stored on their associated servers, and the parity blocks computed for each of the parity groups are stored on respective ones of the servers other than those within that parity group. Such an arrangement advantageously ensures that only a limited number of parity block recomputations are required in response to file block updates.

23 Claims, 4 Drawing Sheets

(56) References Cited

OTHER PUBLICATIONS

J.L. Carter et al., "Universal Classes of Hash Functions," Extended Abstract, Proceedings of the 9th Annual ACM Symposium on Theory of Computing, May 1977, pp. 106-112.

M. Castro et al., "Proactive Recovery in a Byzantine-Fault-Tolerant System," 4th Symposium on Operating System Design and Implementation, Oct. 2000, 15 pages.

R. Curtmola et al., "Robust Remote Data Checking," 4th ACM International Workshop on Storage Security and Survivability, Oct. 2008, 6 pages.

R. Curtmola et al., "MR-PDP: Multiple-Replica Provable Data Possession," International Conference on Distributed Computing Systems, Jun. 2008, 10 pages.

M. Etzel et al., "Square Hash: Fast Message Authentication via Optimized Universal Hash Functions," CRYPTO '99, Advances in Cryptology, Aug. 1999, 21 pages.

D.L.G. Filho et al., "Demonstrating Data Possession and Uncheatable Data Transfer," IACR, Report 2006/150, http://eprint.iacr.org/2006/150, 2006, 9 pages.

J.A. Garay et al., "Secure Distributed Storage and Retrieval," Theoretical Computer Science 243, Jul. 2000, pp. 363-389.

G.R. Goodson et al., "Efficient Byzantine-Tolerant Erasure-Coded Storage," 34th International Conference on Dependable Systems and Networks, Jun.-Jul. 2004, pp. 135-144.

S. Halevi et al., "MMH: Software Message Authentication in the Gbit/second Rates," Fast Software Encryption: 4th International Workshop, FSE '97, Mar. 1997, pp. 1-15, Haifa, Israel.

J. Hendricks et al., "Verifying Distributed Erasure-Coded Data," 26th ACM Symposium on Principles of Distributed Computing, Aug. 2007, 8 pages.

A. Herzberg et al., "Proactive Public Key and Signature Systems," Proceedings of the 4th ACM Conference on Computer and Communications Security, Dec. 1996, 15 pages.

A. Herzberg et al., "Proactive Secret Sharing or: How to Cope with Perpetual Leakage," CRYPTO, Springer-Verlag, Nov. 1995, 22 pages.

A. Juels et al., "PORs: Proofs of Retrievability for Large Files," ACM CCS, 2007, 22 pages.

H. Krawczyk, "LFSR-based Hashing and Authentication," CRYPTO, Springer-Verlag, Aug. 1998, pp. 129-139.

M. Lillibridge et al., "A Cooperative Internet Backup Scheme," Proceedings of the General Track: 2003 USENIX Annual Technical Conference, Jun. 9-14, 2003, pp. 29-41, San Antonio, Texas, USA.

W. Litwin et al., "Algebraic Signatures for Scalable Distributed Data Structures," 20th International Conference on Data Engineering, Mar.-Apr. 2004, 12 pages.

M. Naor et al., "The Complexity of Online Memory Checking," 46th Annual Symposium on Foundations of Computer Science, Oct. 2005, pp. 1-38.

W. Nevelsteen et al., "Software Performance of Universal Hash Functions," Advances in Cryptology, Eurocrypt, Springer-Verlag, May 1999, pp. 1-17.

J.S. Plank et al., "A Performance Evaluation and Examination of Open-Source Erasure Coding Libraries for Storage," 7th USENIX Conference on File and Storage Technologies (FAST), 2009, pp. 253-265.

M.O. Rabin et al., "Efficient Dispersal of Information for Security, Load Balancing, and Fault Tolerance," Journal of the Association for Computing Machinery, Apr. 1989, pp. 335-348, vol. 36, No. 2.

P. Rogaway, "Bucket Hashing and its Application to Fast Message Authentication," Journal of Cryptology, Oct. 1997, pp. 1-24.

T. Schwarz et al., "Store, Forget, and Check: Using Algebraic Signatures to Check Remotely Administered Storage," IEEE International Conference on Distributed Computing Systems (ICDCS), 2006, 10 pages.

H. Shacham et al., "Compact Proofs of Retrievability," Proceedings of Asiacrypt, Report 2008/073, Dec. 2008, pp. 1-36.

M.A. Shah et al., "Auditing to Keep Online Storage Services Honest," Proceedings of the 11th USENIX Workshop on Hot Topics in Operating Systems, May 2007, 6 pages, No. 11, San Diego, CA, USA.

V. Shoup, "On Fast and Provably Secure Message Authentication Based on Universal Hashing," CRYPTO 1996, Dec. 1996, pp. 313-328, vol. 1109.

M.W. Storer et al., "POTSHARDS: Secure Long-Term Storage Without Encryption," USENIX Annual Technical Conference, Jun. 2007, pp. 143-156.

K.D. Bowers et al., "HAIL: A High-Availability and Integrity Layer for Cloud Storage," ACM Conference on Computer and Communications Security, Nov. 2009, pp. 187-198.

Erik Zenner, "Cryptanalysis of LFSR-based Pseudorandom Generators—A Survey," Reihe Informatik, Apr. 2004, 29 pages.

Alfred J. Menezes et al., "Handbook of Applied Cryptography," CRC Press, 1997, 794 pages.

"Linear Feedback Shift Register," from Wikipedia, http://en.wikipedia.org/w/index.php?title=Linear_feedback_shift_register&oldid=369922347#Uses_in_cryptography, 8 pages.

* cited by examiner

```
LEC-encode(K, m);
    for a = 1 to y do
        m_a ← π_{kl}[K,a](m);
            % pseudorandomly permute blocks in m
        for b = 1 to l do
            u_b ← m_{k(b-1)+1} m_{k(b-1)+2} ..., m_{k(b-1)+k};
                % partition stripe of size k
            u'_b ← RS-encode(u_b);
                % compute R-S parity blocks for stripe
            p_a ← p_a || u'_b;
                % accumulate parity blocks
    output c = m || π_{y(n-k)l}[p_1 || ... || p_y];
        % append and pseudorandomly permute parity blocks
```

DISTRIBUTED STORAGE SYSTEM WITH EFFICIENT HANDLING OF FILE UPDATES

RELATED APPLICATION

The present application is related to U.S. patent application Ser. No. 12/495,189, filed Jun. 30, 2009 and entitled "Distributed Storage System with Enhanced Security," the disclosure of which is hereby incorporated by reference herein.

FIELD OF THE INVENTION

The present invention relates generally to the field of data storage, and more particularly to cryptographic techniques for verifying that a given stored file is intact and retrievable.

BACKGROUND OF THE INVENTION

Cloud storage generally refers to a family of increasingly popular on-line services for archiving, backup, and even primary storage of files. Amazon S3 (Simple Storage Service) from amazon.com is a well-known example. Cloud storage providers offer users clean and simple file-system interfaces, abstracting away the complexities of direct hardware management. At the same time, though, such services eliminate the direct oversight of component reliability and security that enterprises and other users with high service-level requirements have traditionally expected.

A number of different approaches to verification of file availability and integrity have been developed in order to restore security assurances eroded by cloud environments. One such approach uses proofs of retrievability (PORs), described in A. Juels et al., "PORs: Proofs of retrievability for large files," ACM CCS, pages 584-597, 2007. A POR is a challenge-response protocol that enables a prover (e.g., a cloud storage provider) to demonstrate to a verifier (e.g., a client or other user) that a file F is retrievable, i.e., recoverable without any loss or corruption. A POR uses file redundancy within a server for verification. The benefit of a POR over simple transmission of F is efficiency. The response can be highly compact (e.g., tens of bytes), and the verifier can complete the proof using a small fraction of F.

Another approach is based on proofs of data possession (PDPs), described in G. Ateniese et al., "Provable data possession at untrusted stores," ACM CCS, pages 598-609, 2007. A typical PDP detects a large fraction of file corruption, but does not guarantee file retrievability. Roughly speaking, a PDP provides weaker assurances than a POR, but potentially greater efficiency.

As standalone tools for testing file retrievability against a single server, though, PORs and PDPs are of limited value. Detecting that a file is corrupted is not helpful if the file is irretrievable and thus the client has no recourse.

Thus PORs and PDPs are mainly useful in environments where F is distributed across multiple systems, such as independent storage services. In such environments, F is stored in redundant form across multiple servers. A verifier can test the availability of F on individual servers via a POR or PDP. If it detects corruption within a given server, it can appeal to the other servers for file recovery.

Other conventional approaches provide distributed protocols that rely on queries across servers to check file availability. See, for example, M. Lillibridge et al., "A cooperative Internet backup scheme," USENIX Annual Technical Conference, General Track 2003, pages 29-41, 2003, and T. Schwarz et al., "Store, forget, and check: Using algebraic signatures to check remotely administered storage," International Conference on Distributed Computing Systems (ICDCS), 2006. In the Lillibridge et al. approach, blocks of a file F are dispersed across n servers using an (n,m)-erasure code (i.e., any m out of the n fragments are sufficient to recover the file). Servers spot-check the integrity of one another's fragments using message authentication codes (MACs). The Schwartz et al. approach ensures file integrity through distribution across multiple servers, using error-correcting codes and block-level file integrity checks. This approach employs keyed algebraic encoding and stream-cipher encryption to detect file corruptions.

However, the various known approaches noted above are deficient in important respects. For example, none of these approaches adequately addresses the case of what we refer to herein as a "mobile adversary," that is, one that is capable of progressively attacking storage providers and, in principle, ultimately corrupting all providers at different times.

SUMMARY OF THE INVENTION

Illustrative embodiments of the present invention overcome the deficiencies of conventional practice by providing an improved distributed storage system particularly well suited for use in cloud storage environments. The distributed storage system in one or more such embodiments incorporates cryptographic functionality referred to herein as High-Availability and Integrity Layer (HAIL). More specifically, the illustrative embodiments include HAIL variants that are particularly efficient in the presence of file updates.

In one aspect of the invention, a client device or other processing device comprises a file encoding module, with the file encoding module being configured to separate a file into a plurality of sets of file blocks, to assign sets of the file blocks to respective ones of a plurality of servers, to define a plurality of parity groups each comprising a different subset of the plurality of servers, to assign, for each of the servers, each of its file blocks to at least one of the defined parity groups, and to compute one or more parity blocks for each of the parity groups. The file blocks are stored on their associated servers, and the parity blocks computed for each of the parity groups are stored on respective ones of the servers other than those within that parity group.

In accordance with another aspect of the invention, contents of at least one file block are modified, and responsive to this modifying of one or more file blocks, the parity blocks previously computed for each parity group corresponding to the one or more modified file blocks are substantially simultaneously updated.

In one of the illustrative embodiments, the parity groups are each defined as a sequence of k specified servers of the plurality of servers such that there are n different parity groups $PG_1 = \{S_1, \ldots, S_k\}, \ldots, PG_n = \{S_n, S_1, \ldots, S_{k-1}\}$ where n denotes the number of servers in the plurality of servers and k<n. The file may comprise m=lk file blocks evenly separated into n sets of file blocks, with n-k parity blocks being computed for each of the parity groups using a systematic (k, n) Reed-Solomon code.

The parity groups in a given embodiment are generally constructed in such a way that the parity group structure is unpredictable without access to a secret that is known to the entity that assigns the file blocks to the parity groups. More specifically, the parity groups may be constructed such that, given access to one of the above-noted subsets of servers, it is infeasible to determine for at least a particular one of the file blocks stored on one of the servers of that subset which other file blocks stored on the servers of the subset are part of the same parity group as the particular file block. The parity group structure in such an embodiment ensures that an adversary with access to only a subset of the servers cannot feasibly modify file contents without being required to modify many file blocks.

The illustrative embodiments advantageously overcome the above-noted drawbacks of conventional approaches to verification of file availability and integrity in cloud storage environments. For example, one or more of these embodiments provide adequate security against the previously-described mobile adversary that is capable of progressively attacking multiple storage providers over time. Also, one or more of the illustrative embodiments advantageously ensure that only a limited number of parity block recomputations are required in response to file block updates.

These and other features and advantages of the present invention will become more readily apparent from the accompanying drawings and the following detailed description.

DETAILED DESCRIPTION

The present invention will be described herein with reference to exemplary storage systems and associated client devices, servers and other processing devices. It is to be appreciated, however, that the invention is not restricted to use with the particular illustrative system and device configurations shown.

Figure 1:
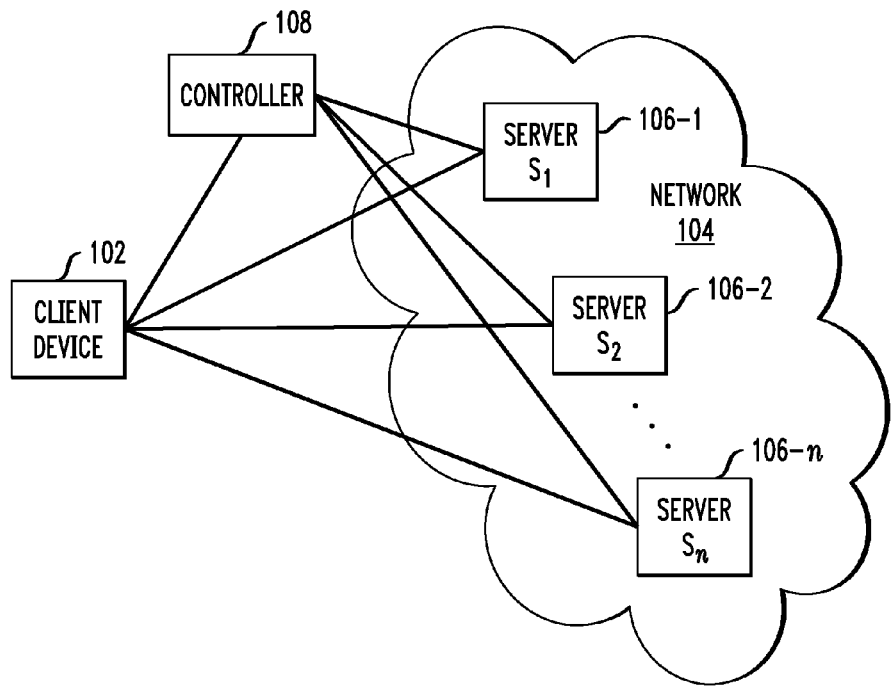
FIG. 1 is a block diagram showing one example of a distributed storage system in an illustrative embodiment of the invention.

FIG. 1 shows an example of a storage system 100 which includes a client device 102, a network 104, and servers 106-1, 106-2, ... 106-$n$. The system is a distributed storage system in which a given file F is stored across multiple ones of the servers 106 using redundancy to support file recovery in the presence of server errors or failures. More detailed examples of this redundancy will be described below in conjunction with FIGS. 3, 6 and 7. A verifier associated with the client device 102 can check the integrity of F by processing portions of F retrieved from respective individual servers.

The client device 102 may be, for example, a desktop, laptop or palmtop personal computer, a mobile telephone, a personal digital assistant (PDA), a wireless email device, a workstation, a kiosk, a television set-top box, a game console, or more generally any type of information processing device from which a user or other verifier may wish to verify availability and integrity of a given file F stored in a distributed manner utilizing two or more of the n servers 106. The client device may also be referred to herein as simply a "client." The latter term is intended to be construed generally, so as to encompass the client device, a user of that device, or a combination of both of these entities.

A particular server 106 may be implemented as a computer or other stand-alone processing platform, or may be distributed over multiple processing platforms comprising multiple separate computers. The servers may be part of a single storage service or various subsets thereof may each be associated with independent storage services. Numerous other arrangements of multiple servers are possible in the storage system 100. The client device 102 and the servers 106 are examples of what are more generally referred to herein as "processing devices."

The client device 102 will generally include a user interface through which an associated user can interact with the system. This interaction allows the user to store files in a distributed manner using the servers 106, to verify availability and integrity of any such stored files, and to retrieve any such stored files.

The client device 102 may interact directly with the servers 106. Alternatively, a portion of the interaction between the client device and the servers may be carried out via an associated intermediary, illustratively shown in this embodiment as a controller 108.

The network 104, although illustratively shown as the Internet, may comprise, for example, a wide area network (WAN), a local area network (LAN), a satellite network, a telephone or cable network, or various portions or combinations of these and other types of networks.

The network 104 comprising servers 106 is an example of a type of arrangement commonly referred to as a "cloud." Distributed storage involving the n servers is representative of a cloud storage environment.

It is to be appreciated that a given embodiment of the system 100 may include multiple instances of client device 102, network 104 and server set 106, although only single instances of such components are shown in the simplified system diagram for clarity of illustration. For example, a given user may have multiple personal computing devices that access different sets of servers over different networks. The particular number of servers in a given such set of servers is arbitrary and may vary depending upon the application. For example, the server sets may all have different numbers of servers denoted $n_1$, $n_2$, $n_3$, and so on.

Figure 2:
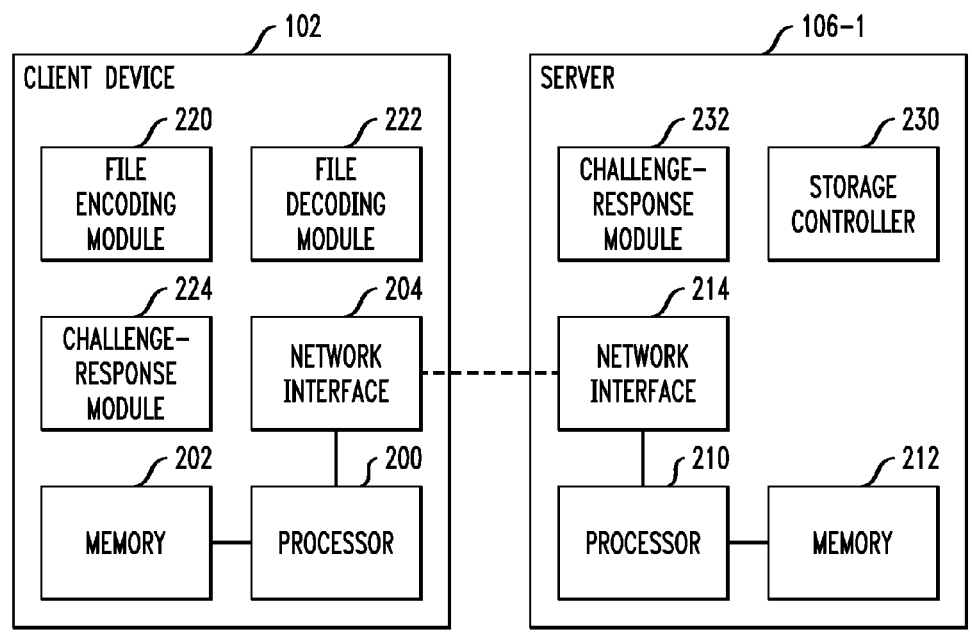
FIG. 2 is a more detailed view of the client device and a given one of the servers of the FIG. 1 system.

Referring now to FIG. 2, a more detailed illustrative implementation of client device 102 and a given server 106-1 is shown. The other servers 106-2 through 106-$n$ are each assumed to be configured in substantially the same manner as server 106-1.

The client device 102 in this embodiment comprises a processor 200 coupled to a memory 202 and a network interface 204. Similarly, the server 106-1 comprises a processor 210 coupled to a memory 212 and a network interface 214. The client device and server communicate via their respective network interfaces, which may comprise conventional transceiver circuitry of a type well known to those skilled in the art. The processors 200 and 210 may comprise microprocessors, microcontrollers, application-specific integrated circuits (ASICs), field programmable gate arrays (FPGAs) or other types of processing circuitry, as well as portions or combinations of such circuitry elements.

The client device 102 further includes a file encoding module 220, a file decoding module 222, and a challenge-response module 224. The file encoding module 220 processes a given file F to generate multiple blocks that are stored across multiple ones of the servers 106 in the manner illustrated in FIG. 3, 6 or 7. The file decoding module 222 processes blocks retrieved from the servers in order to recreate the original file F. The challenge-response module 224 implements a client portion of a challenge-response protocol through which the client device can interact with the servers 106 to verify availability and integrity of the given file F as stored across the servers. More particularly, the challenge-response module generates periodic challenges that are sent to respective ones of the servers, and processes the corresponding responses received back from the servers.

The server 106-1 comprises a storage controller 230 for directing storage of one or more blocks associated with the given file F into appropriate portions of the memory 212. The server further includes a challenge-response protocol module 232 for implementing the server portion of the challenge-response protocol. This module receives periodic challenges from the client device 102 and generates appropriate responses.

The modules 220, 222 and 224 of the client device 102 may be implemented in whole or in part in the form of one or more software programs stored in memory 202 and executed by processor 200. Similarly, the modules 230 and 232 of the server 106-1 may be implemented at least in part in the form of one or more software programs stored in memory 212 and executed by processor 210. The memories 202 and 212 may each be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device such as client device 102 or server 106 causes the device to perform corresponding operations associated with functions such as encoding of files for storage across multiple servers, verification of availability and integrity of stored files, and decoding of stored files retrieved from the servers. One skilled in the art would be readily able to implement such software given the teachings provided herein. Other examples of computer program products embodying aspects of the invention may include, for example, optical or magnetic disks.

In alternative embodiments, one or more of the modules associated with the client device 102 or the server 106 may be implemented at least in part within a separate entity such as the controller 108.

The storage system 100 in an illustrative embodiment implements cryptographic functionality referred to herein as HAIL. In HAIL, a client distributes a file F with redundancy across n servers. As will be described, HAIL provides, among other advantages, enhanced security relative to that provided using conventional approaches. More specifically, HAIL provides reliance against a mobile adversary that can potentially corrupt all n of the servers, but can control only b out of the n servers within any given time step. We refer to a time step in this context as an "epoch."

In each epoch, the client or an associated entity such as controller 108 performs a number of checks to assess the integrity of F in the system, using the above-noted challenge-response protocol. If corruptions are detected on some servers, then F can be reconstituted from redundancy in intact servers and known faulty servers updated or replaced. Such periodic integrity checks and remediation are an important part of guaranteeing data availability against a mobile adversary: Without integrity checks, the adversary can corrupt all servers in turn across $\lceil n/b \rceil$ epochs and modify or purge F at will.

HAIL distributes blocks of the file F across the n servers using an encoding process that involves application of two different types of codes, referred to herein as server codes and dispersal codes. The file encoding process of HAIL in the present embodiment is carried out by file encoding module 220 of client device 102 and will be described below with reference to FIGS. 3A and 3B.

Let (n,l) be the parameters of the dispersal code. We assume for simplicity and clarity of description that this code is systematic, i.e., that it preserves l message blocks in their original form. Then l is the number of primary servers, those servers that store fragments of the original file F. The remaining n-l are secondary servers, or redundant servers, i.e., servers that maintain additional redundancy in the form of parity blocks used to help recover from failure.

Figure 3B:
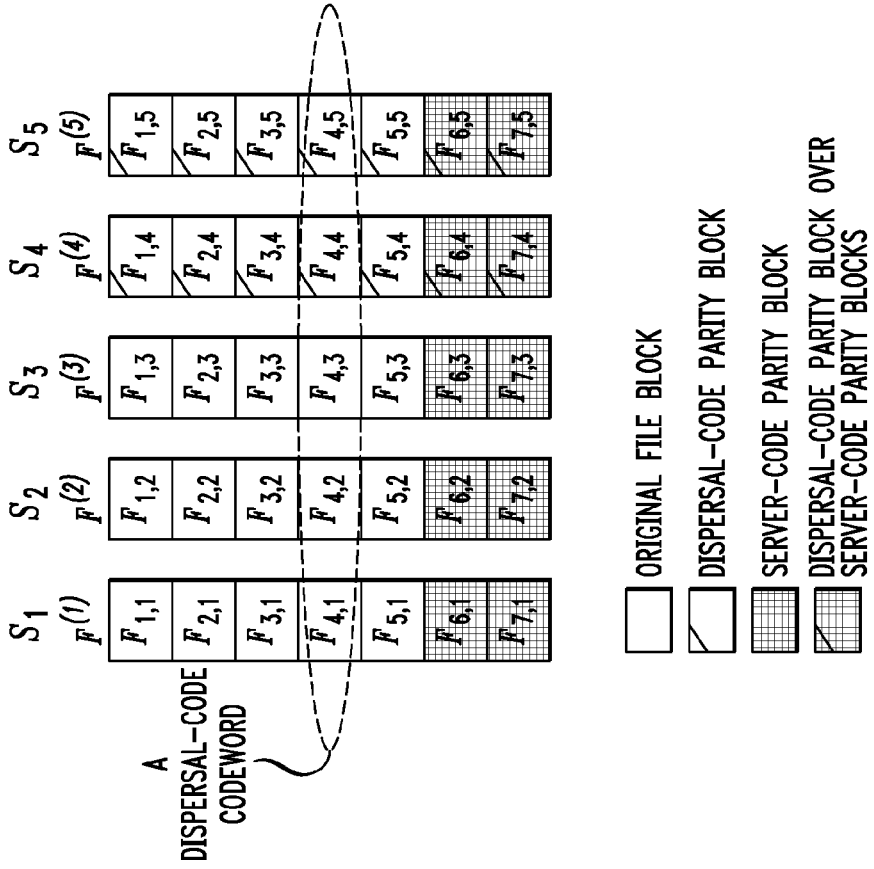
FIGS. 3A and 3B illustrate an exemplary technique for encoding a given file for distributed storage in the system of FIG. 1.
Figure 3A:
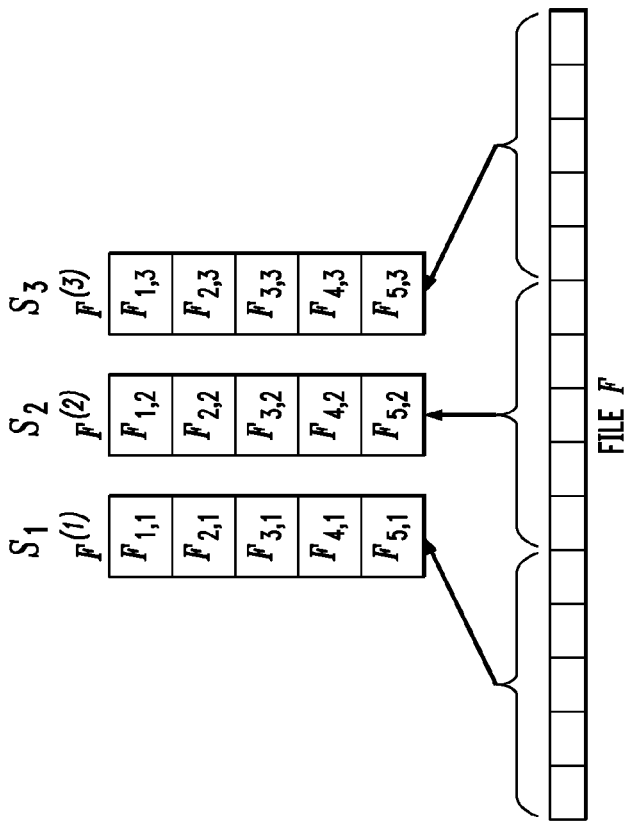

Before transforming the file F into a distributed, encoded representation, we partition it into l distinct blocks or segments $F^{(1)}, \ldots, F^{(l)}$ and distribute these segments across the primary servers $S_1, \ldots, S_l$. An example of this partitioning of file F for l=3 is shown in FIG. 3A. The distributed cleartext representation of the file remains untouched by our subsequent encoding steps in this embodiment.

The partitioning may be viewed as producing a matrix of blocks of the original file, as illustrated in FIG. 3A.

We then encode each segment $F^{(j)}$ under the server code with error rate $\epsilon_c$. The effect of the server code is to extend the "columns" of the encoded matrix by adding parity blocks.

Next, we apply the dispersal code to create the parity blocks that reside on the secondary servers. It extends the "rows" of the encoded matrix across the full set of n servers $S_1, \ldots, S_n$. The resulting arrangement for l=3 and n=5 is shown in FIG. 3B.

With this encoding process, it is possible to use cross-server redundancy to check the integrity of F. The client or other verifier simply checks that the blocks in a given position, i.e., "row," constitute a valid codeword in the dispersal code. The overall storage cost associated with this encoding process is (n/l)|F|.

The server code in this embodiment of HAIL uses an adversarial ECC. Adversarial ECCs are codes resistant to a large fraction of adversarial corruptions. While a standard ECC is designed to provide information-theoretic properties, an adversarial ECC uses cryptography to achieve otherwise inefficient or impossible levels of resilience against a computationally bounded adversary. An (n,l,d)-ECC corrects up to $$\left\lfloor \frac{d-1}{2} \right\rfloor$$

errors, and thus it supports a fraction of $$\frac{d-1}{2n}$$

adversarial corruption. Examples of adversarial codes based on cryptographically protected, striped Reed-Solomon codes are described in K. Bowers et al., "Proofs of retrievability: Theory and implementation," 2008. In their construction, a file is permuted first with a secret key and then divided into stripes. Parity blocks are computed for each stripe and appended to the unmodified file. To hide stripe boundaries, parity blocks are encrypted and permuted with another secret key. The encoding of the file consists of the original file followed by the permuted and encrypted parity blocks, and is systematic.

A given time step or epoch in the HAIL embodiment described in conjunction with FIGS. 3A and 3B may be viewed as comprising three phases:

1. A corruption phase: An adversary A chooses a set of up to b servers to corrupt, where b is a security parameter.
2. A challenge phase: A trusted entity T challenges some or all of the servers.
3. A remediation phase: If T detects any corruptions in the challenge phase, it may modify/restore servers' file shares.

Additional details regarding these and other illustrative embodiments of HAIL are described in the above-cited U.S. patent application Ser. No. 12/495,189.

In the HAIL embodiment of FIGS. 3A and 3B, file updates are not explicitly addressed. However, it is desirable in such embodiments to ensure that small updates do not necessitate modification of a large fraction of the stored file. HAIL variants in which file updates are highly efficient will now be described with reference to FIGS. 4 though 7. For example, in one or more of the illustrative embodiments to be described, modifying one underlying file block induces only a constant number of block modifications per server. This advantageous feature is achieved using what is referred to herein as a locally encodable code (LEC). An LEC as disclosed herein is an error-correcting code in which a message symbol can be modified with a limited number of changes to the corresponding codeword. It is similar in some respects to a locally decodable code (LDC), which is an error-correcting code that permits message symbols to be recovered from a fraction of the full codeword.

It should be noted that the particular HAIL variants to be described below utilize only a single code, unlike the arrangement shown in FIGS. 3A and 3B which utilizes both a server code and a dispersal code.

Figures 4, 5:
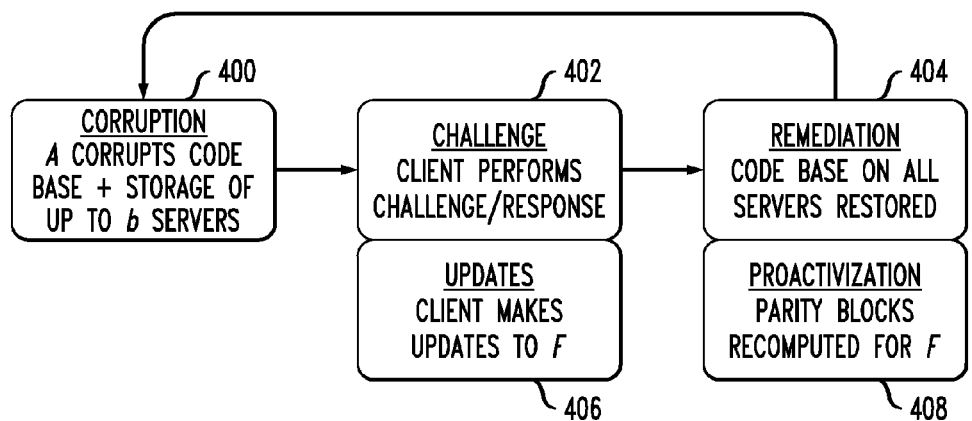
FIG. 4 is a flow diagram showing phases of a process involving file updates in an illustrative embodiment of the invention.
FIG. 5 shows pseudocode for encoding of files using a locally encodable code (LEC).

FIG. 4 shows the phases associated with a given time step or epoch in a HAIL variant which explicitly takes updates into account. The phases shown include the above-noted corruption, challenge and remediation phases, which are denoted as phases 400, 402 and 404, respectively, in the figure. The trusted entity T in this embodiment is assumed to be the client device 102, also referred to as the client. Also shown is an update phase 406, in which the client makes updates to the file F, and a proactivation phase 408, in which parity blocks are recomputed for the updated file F. Thus, this embodiment proactively re-encodes F at the end of each epoch by recomputing certain parity blocks for the file, where the fraction of parity blocks requiring recomputation depends on the number of servers the adversary can corrupt. As will be described, the file F is encoded under an LEC having a property that is referred to herein as z-server peek-resistance, where z is at least as large as the number of servers the adversary can compromise per epoch.

An exemplary peek-resistant LEC construction will now be described with reference to FIG. 5. Let m be an input message, where |m|=kl. Thus, the message m may be viewed as a file F comprising kl message blocks. Such message blocks are examples of what are more generally referred to herein as "file blocks." The message m is partitioned pseudorandomly into l groups or "stripes" of k message blocks, and each such stripe is encoded under a systematic (k,n)-RS code, yielding n-k parity blocks. Thus, partitioning and encoding over the entire message m yields (n-k)l parity blocks. Repeating this partitioning and encoding procedure y times yields y(n-k)l parity blocks. Once all parity blocks are computed, they are permuted and encrypted. The procedure is thus performed over y "rounds" for any y, and each message block in F has y associated stripes in the resulting encoded file $\tilde{F}$.

With this approach, the adversary does not learn sufficient structural information about the LEC at any time to corrupt individual stripes successfully with high probability. In order to corrupt F, therefore, the adversary must corrupt a significant fraction of the blocks contained in servers under its control, an action that the HAIL variant can detect and remediate with high probability.

It should be noted that the term "random" as used herein is intended to be construed broadly so as to encompass pseudorandom arrangements.

FIG. 5 shows pseudocode for encoding of the input message m using the above-described peek-resistant LEC. The overall encoding function is denoted LEC-encode. The function RS-encode denotes encoding using the systematic (k,n)-RS code. It is assumed for simplicity that RS-encode outputs parity blocks only, and thus that the code is systematic. The function $\pi_t[K,a](s_1 s_2 \ldots s_t)$ denotes a pseudorandom permutation on a sequence of t blocks, keyed with K and taking counter input a.

Corresponding decode and recode functions LEC-decode and LEC-recode can be configured in the following manner. The function LEC-recode determines and recomputes the parity blocks associated with message block $m_i$. It modifies y(n-k) parity blocks, and thus has y(n-k)-locality. The function LEC-decode attempts to reconstruct, for $1 \leq a \leq y$, each stripe in $m_a$ based on the message blocks in c and the corresponding (n-k)l parity blocks. Each message block $m_i$ is then computed via majority decoding.

As indicated previously, the LEC in the present embodiment has z-server peek resistance, which means that the stored file cannot be corrupted by an adversary that is able to compromise at most z servers. Thus, the adversary's "peek" is confined to the servers it has compromised.

In implementing such an LEC, the message and parity blocks generated in the manner described above are mapped onto a set of servers such that each stripe is horizontally aligned across the set of servers, and each stripe is randomly structured, i.e., includes blocks in independently selected, pseudorandom positions on each server. It is also convenient for the stripes to be "balanced," meaning that a given stripe includes one block on each server, and every server has the same number of blocks in total. The resulting LEC is referred to as a balanced LEC.

A balanced LEC providing the properties described above can be configured for mapping across a set S of servers in the following manner. Assume the file F=m is partitioned into equal-sized, distinct message segments $m^{(1)}, m^{(2)}, \ldots, m^{(n)}$ across the n servers. We define a parity group as a sequence of k servers, i.e., there are n different parity groups: $PG_1 = \{S_1, \ldots, S_k\}, \ldots, PG_n = \{S_n, S_1, \ldots, S_{k-1}\}$. The balanced LEC is then constructed by performing the following operations:

1. For each server $S_i$, randomly partition message blocks in $m^{(i)}$ into n sets. Assign each set to a distinct parity group $PG_j$ such that $S_i \in PG_j$.
2. Within each parity group $PG_j$, randomly partition message blocks into stripes. For each such stripe, compute n-k parity blocks for placement on servers $S-PG_j$.

These operations are repeated for each of the y rounds, that is, for a=1 to y. Finally, for each server $S_i$, all parity blocks within that server are pseudorandomly permuted.

Figure 6:
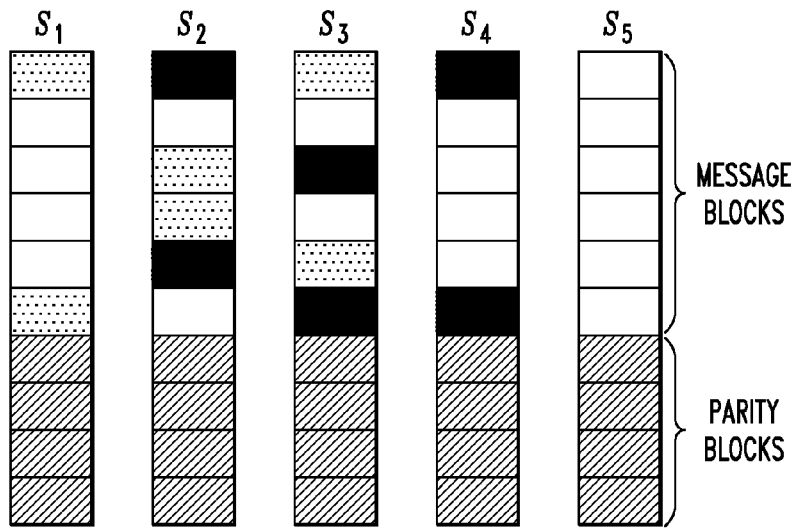
FIG. 6 illustrates an exemplary technique for encoding a given file for distributed storage in the system of FIG. 1 using the LEC of FIG. 5 with particular blocks of the file being associated with specified parity groups.

FIG. 6 illustrates the above-described balanced LEC encoding technique for an example in which k=3, n=5, l=10 and y=1. The total number of message blocks in m is 30, and the number of parity blocks is (n-k)l=20. The message and parity blocks are distributed across the set of n=5 servers as shown in the figure, with particular blocks being associated with specified parity groups. The parity groups in this example include two parity groups denoted $PG_1=\{S_1, S_2, S_3\}$ and $PG_2=\{S_2, S_3, S_4\}$. Each such group includes two message blocks on each of the servers $S_1$ through $S_5$.

Figure 7:
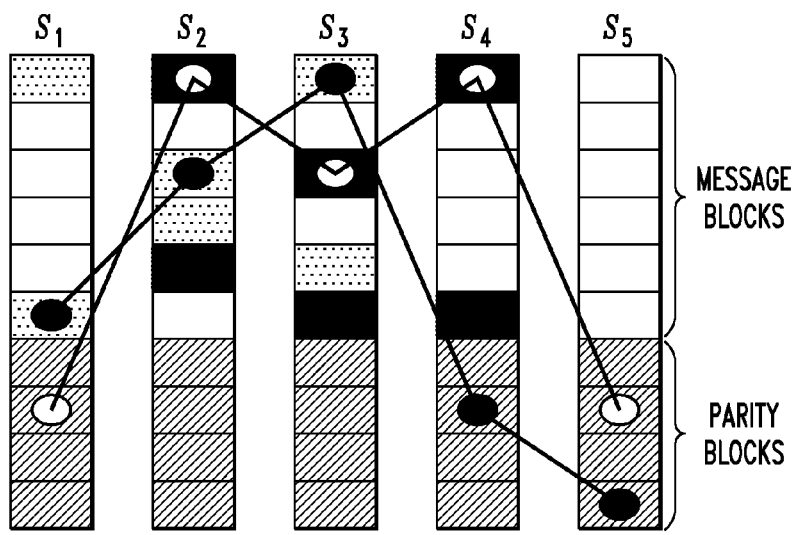
FIG. 7 illustrates representative "stripes" or rows of blocks for respective ones of the parity groups in FIG. 6.

Two horizontally arranged stripes in the FIG. 6 example are shown in FIG. 7, with one stripe in each of the parity groups $PG_1=\{S_1, S_2, S_3\}$ and $PG_2=\{S_2, S_3, S_4\}$. Each stripe includes three message blocks and two parity blocks, with one such block on each of the n=5 servers. There are a total of l=10 such stripes in this example, although only two are shown for clarity and simplicity of illustration. The stripes may be viewed as "rows" of blocks in that they are arranged horizontally so as to include one block on each server.

Referring again to FIG. 4, the challenge phase 402 in the case of the above-described balanced LEC encoding issues challenges across stripes within a parity group, but is otherwise configured in accordance with the HAIL protocol. In the remediation phase 404, recoding is performed for a given message block $m_i$ in F by determining and recomputing all parity blocks in the y corresponding stripes. More generally, responsive to the modification of the contents of at least one file block, the parity blocks previously computed for each parity group corresponding to the one or more modified file blocks are substantially simultaneously updated. The above-noted function LEC-recode may be used to determine and recompute the parity blocks associated with message block $m_i$. This function modifies y(n-k) parity blocks. The proactivation phase 408, as previously described, involves recomputing certain parity blocks for file F.

It is to be appreciated that the particular encoding examples given above are not intended to be limiting in any way, and the various parameters used, such as the configuration of the parity groups, the number and arrangement of stripes, and the type of codes applied, should not be viewed as requirements of the invention. For example, in other embodiments, a given message block may be assigned to multiple parity groups.

Also, the parity groups in a given embodiment need not be constructed randomly, but are instead generally constructed in such a way that the parity group structure is unpredictable without access to a secret that is known to the entity that assigns the blocks to the parity groups. More specifically, the parity groups may be constructed such that, given access to only a subset of the servers, for at least one file block stored on a server of the subset, it is infeasible with high probability to determine which of the other blocks stored on servers of the subset are in the same parity group as the given block. The term "infeasible" in this context refers to computational infeasibility, such that it is impossible or highly impractical to determine the other blocks using readily available levels of computational resources. The parity group structure in such an embodiment ensures that an adversary with access to a subset of the servers cannot feasibly modify file contents without modifying many file blocks.

As indicated previously, the distributed storage functionality disclosed herein can be implemented at least in part in the form of one or more software programs stored in memory and executed by a processor of a processing device such as client device 102 or controller 108. As indicated previously, a memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of storage systems and processing devices. The particular process steps used to encode, decode and verify a given file may be varied in alternative embodiments. Also, the types of codes used in a given alternative embodiment may be varied relative to the arrangements of the illustrative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   separating a file into a plurality of sets of file blocks;
   assigning sets of the file blocks to respective ones of a plurality of servers;
   defining a plurality of parity groups each comprising a different subset of the plurality of servers;
   for each of the servers, assigning each of its file blocks to at least one of the defined parity groups;
   computing one or more parity blocks for each of the parity groups;
   storing the file blocks on their associated servers;
   storing the parity blocks such that said one or more parity blocks computed for each of the parity groups are stored on respective ones of the plurality of servers other than the servers within that parity group; and
   in each of a plurality of epochs, performing a challenge phase, a remediation phase, a file update phase, and a proactivization phase;
   wherein the challenge phase comprises issuing challenges to respective ones of the servers and processing responses to the challenges to determine corruption of the file blocks, the remediation phase comprises restoring file blocks determined to be corrupted during the challenge phase, the file update phase comprises making one or more updates to the file, and the proactivization phase comprises recomputing a fraction of parity blocks for the updated file, the fraction being based on a number of servers assumed to be corruptible by an adversary per epoch;
   wherein the file blocks and one or more parity blocks associated with each parity group are stored in respective independently and randomly selected positions on respective ones of the plurality of servers; and
   wherein the plurality of parity groups are defined such that respective structures of the parity groups are not predictable without access to a secret used in assigning the file blocks to the parity groups.

2. The method of claim 1 further comprising the steps of:
   modifying contents of at least one of the file blocks; and
   responsive to the modifying, substantially simultaneously updating the parity blocks previously computed for each parity group corresponding to said one or more modified file blocks.

3. The method of claim 1 wherein the parity groups are each defined as a sequence of k specified servers of the plurality of servers such that there are n different parity groups $PG_1=\{S_1, \ldots, S_k\}, \ldots, PG_n=\{S_n, S_1, \ldots, S_{k-1}\}$ where n denotes the number of servers in the plurality of servers and k<n.

4. The method of claim 3 wherein the file comprises m=lk file blocks evenly separated into n sets of file blocks, wherein m is an input message, and l is a number of groups of message blocks.

5. The method of claim 3 wherein n-k parity blocks are computed for each of the parity groups.

6. The method of claim 3 wherein said one or more parity blocks are computed for each of the parity groups using a systematic (k, n) Reed-Solomon code.

7. The method of claim 1 further comprising the step of randomly permuting the parity blocks to be stored on each of the servers.

8. The method of claim 1 further comprising the step of repeating at least one additional round of said assigning, for each of the plurality of servers, each of its file blocks to at least one of the defined parity groups and said computing one or more parity blocks for each of the parity groups.

9. The method of claim 1 wherein the file blocks and one or more parity blocks associated with each parity group are stored on respective ones of the plurality of servers with one such block being stored on each server.

10. The method of claim 9 wherein each of the servers stores the same number of file blocks and parity blocks.

11. The method of claim 1 wherein an update to a given one of the file blocks requires a predetermined constant number of parity block recomputations, the predetermined constant number of parity block recomputations being less than a number of parity block computations required for the computing the one or more parity blocks for each of the parity groups.

12. A computer program product comprising a non-transitory processor-readable storage medium having encoded therein executable code of one or more software programs, wherein the one or more software programs when executed by a processor implement the steps of the method of claim 1.

13. The method of claim 1 wherein, for a given parity group, a first one of the file blocks or one or more parity blocks is stored in a first position on a first one of the servers and a second one of the file blocks or one or more parity blocks is stored in a second position on a second one of the servers, the first position being different than the second position.

14. An apparatus comprising:
a processing device including a processor, a memory coupled to the processor, and a network interface configured to support communication between the processing device and a plurality of servers;
wherein the processing device further comprises a file encoding module, the file encoding module being configured to separate a file into a plurality of sets of file blocks, to assign sets of the file blocks to respective ones of a plurality of servers, to define a plurality of parity groups each comprising a different subset of the plurality of servers, to assign, for each of the servers, each of its file blocks to at least one of the defined parity groups, to compute one or more parity blocks for each of the parity groups, to store the file blocks on their associated servers, to store the parity blocks such that said one or more parity blocks computed for each of the parity groups are stored on respective ones of the plurality of servers other than the servers within that parity group, and, in each of a plurality of epochs, to perform a challenge phase, a remediation phase, a file update phase, and a proactivization phase;
wherein the challenge phase comprises issuing challenges to respective ones of the servers and processing responses to the challenges to determine corruption of the file blocks, the remediation phase comprises restoring file blocks determined to be corrupted during the challenge phase, the file update phase comprises making one or more updates to the file, and the proactivization phase comprises recomputing a fraction of parity blocks for the updated file, the fraction being based on a number of servers assumed to be corruptible by an adversary per epoch;
wherein the file encoding module is configured to store the file blocks and the one or more parity blocks associated with each parity group in respective independently and randomly selected positions on respective ones of the plurality of servers; and
wherein the plurality of parity groups are defined such that respective structures of the parity groups are not predictable without access to a secret used in assigning the file blocks to the parity groups.

15. The apparatus of claim 14 wherein the file encoding module is further configured to modify contents of at least one of the file blocks, and responsive to the modifying, to substantially simultaneously update the parity blocks previously computed for each parity group corresponding to said one or more modified file blocks.

16. The processing device of claim 14 wherein said processing device comprises a client device.

17. The processing device of claim 14 wherein said processing device further comprises a file decoding module configured to reconstruct the file from blocks retrieved from the plurality of servers.

18. The processing device of claim 14 wherein said processing device further comprises a challenge-response module configured to issue challenges to respective ones of the servers, and to process responses to the challenges to determine if the number of stored file blocks containing faults exceeds a specified threshold.

19. The processing device of claim 14 wherein an update to a given one of the file blocks requires a predetermined constant number of parity block recomputations, the predetermined constant number of parity block recomputations being less than a number of parity block computations required to compute the one or more parity blocks for each of the parity groups.

20. A distributed storage system comprising:
a plurality of servers; and
at least one processing device configured to communicate with the plurality of servers;
wherein the processing device comprises a file encoding module configured to separate a file into a plurality of sets of file blocks, to assign sets of the file blocks to respective ones of a plurality of servers, to define a plurality of parity groups each comprising a different subset of the plurality of servers, to assign, for each of the servers, each of its file blocks to at least one of the defined parity groups, to compute one or more parity blocks for each of the parity groups, to store the file blocks on their associated servers, to store the parity blocks such that said one or more parity blocks computed for each of the parity groups are stored on respective ones of the plurality of servers other than the servers within that parity group, and, in each of a plurality of epochs, to perform a challenge phase, a remediation phase, a file update phase, and a proactivization phase;
wherein the challenge phase comprises issuing challenges to respective ones of the servers and processing responses to the challenges to determine corruption of the file blocks, the remediation phase comprises restoring file blocks determined to be corrupted during the challenge phase, the file update phase comprises making one or more updates to the file, and the proactivization phase comprises recomputing a fraction of parity blocks for the updated file, the fraction being based on a number of servers assumed to be corruptible by an adversary per epoch;

wherein the file encoding module is configured to store the file blocks and the one or more parity blocks associated with each parity group in respective independently and randomly selected positions on respective ones of the plurality of servers; and wherein the plurality of parity groups are defined such that respective structures of the parity groups are not predictable without access to a secret used in assigning the file blocks to the parity groups.

21. The system of claim 20 wherein the processing device comprises a client device.

22. The system of claim 20 wherein the plurality of servers are part of a cloud storage system.

23. The system of claim 20 wherein an update to a given one of the file blocks requires a predetermined constant number of parity block recomputations, the predetermined constant number of parity block recomputations being less than a number of parity block computations required to compute the one or more parity blocks for each of the parity groups.

* * * * *